United States Patent [19]

Spencer

[11] Patent Number: 4,729,305
[45] Date of Patent: Mar. 8, 1988

[54] METHOD AND APPARATUS FOR MAKING PRINTED ELASTIC BANDS

[75] Inventor: Richard R. Spencer, Hot Springs, Ark.

[73] Assignee: Alliance Rubber Company, Hot Springs, Ark.

[21] Appl. No.: 817,657

[22] Filed: Jan. 10, 1986

[51] Int. Cl.⁴ .................. B41F 17/10; B26D 7/08
[52] U.S. Cl. ...................... 101/35; 101/122; 101/126; 101/426; 101/416 A; 83/19; 83/100; 83/176; 83/356.3; 83/371; 83/925 EB
[58] Field of Search ............. 101/35, 36, 37, 122, 101/426, 416 A, 425, DIG. 19, 124, 126; 83/19, 176, 925 EB, 371, 356.3, 100; 226/20, 19

[56] References Cited

U.S. PATENT DOCUMENTS

| | | | |
|---|---|---|---|
| 1,546,834 | 7/1925 | Hanington | 101/122 X |
| 2,037,254 | 4/1936 | Miller | 101/35 X |
| 2,102,689 | 12/1937 | Fischer | 101/35 X |
| 2,121,022 | 6/1938 | Cornwell | 101/426 X |
| 2,710,577 | 6/1955 | Prett | 101/124 |
| 2,753,001 | 7/1956 | Page | 83/19 |
| 2,824,610 | 2/1958 | Schubert et al. | 83/100 X |
| 3,146,653 | 9/1964 | Kuts | 83/925 EB X |
| 3,313,461 | 4/1967 | Andersen | 226/20 |
| 3,407,690 | 10/1968 | Stanley | 83/371 X |
| 3,527,166 | 9/1970 | Jaffa et al. | 101/126 X |
| 3,679,112 | 7/1972 | Black et al. | 226/19 X |
| 4,263,845 | 4/1981 | Okamura | 101/35 |
| 4,434,562 | 3/1984 | Bubley et al. | 101/416 A X |
| 4,572,686 | 2/1986 | Tanaka | 83/371 X |
| 4,579,027 | 4/1986 | Lewis | 83/925 EB X |

FOREIGN PATENT DOCUMENTS

| | | | |
|---|---|---|---|
| 2042817 | 4/1971 | Fed. Rep. of Germany | 83/19 |
| 2112710 | 7/1983 | United Kingdom | 101/DIG. 19 |
| 2126169 | 3/1984 | United Kingdom | 101/35 |

Primary Examiner—Clifford D. Crowder
Attorney, Agent, or Firm—James Creighton Wray

[57] ABSTRACT

A method and apparatus for making printed elastic bands from elastic tubing. The tubing is conveyed, perforated for exhausting fluid therefrom, flattened, cleaned, dried, printed and cut into printed elastic bands.

49 Claims, 8 Drawing Figures

METHOD AND APPARATUS FOR MAKING PRINTED ELASTIC BANDS

BACKGROUND OF THE INVENTION

This application relates to the manufacture of elastic bands and particularly to printed elastic bands.

Elastic bands may be made according to methods described in U.S. Pat. Nos. 2,781,550 and 3,787,552. Preferably, tubes are extruded and cured and are directly fed into the present apparatus.

One problem of printing rubber bands is that it is difficult to imprint the bands with ink which uniformly attaches to or impregnates the surfaces of the band.

When elastic bands are made by cutting off ends of tubes, it is difficult to cut the tubes at high speed in registry with the printing so that the printing is centered on the band.

In printing rubber bands, it is extremely difficult to print the bands without smearing or otherwise fouling the ink-substrate relationship.

Another problem associated with rubber bands is that it is difficult to direct and guide the tubing so that printing may be precisely positioned on the tubing and so that the ends of the tubing may be cut off at precise positions.

Another problem associated with the manufacture of rubber bands is that it is difficult to flatten the tubing before working with the tubing.

The present invention provides solutions to many of the problems associated with manufacture of printed rubber bands.

SUMMARY OF THE INVENTION

Printed elastic bands are made by piercing, evacuating and flattening an elastic tubing and washing and scrubbing and drying the upper surface of the tubing, aligning a tubing on a conveyor and moving the tubing upward toward a printing head and quickly downward away from the printing head while maintaining the tubing flattened. The printing is devolatilized and cured while the tubing continues to move to the cutoff point. Nip rollers drive a tubing onto a cutoff platen, a final roller near the edge of the platen has a higher surface speed than the nip rollers to flatten the tubing. Printing on the tubing is sensed and rotating knives are sensed and the speed of the nip rollers is controlled to cut the tubing between the printed areas. Severed printed bands are removed by vacuum and are discharged from a cyclone separator.

The preferred method of making printed elastic bands comprises feeding elastic tubing into a perforating apparatus, perforating the tubing, exhausting fluid from within the tubing, flattening the tubing, cleaning the tubing, drying the tubing, continuously conveying the tubing, keeping the tubing flat, aligning the tubing, printing the tubing, aligning the printed tubing, driving the tubing, drying and curing the printed image, and cutting off lengths of the printed tubing into printed elastic bands and removing the printed elastic bands.

The preferred perforating comprises feeding the tubing over a roller with generally radially directed spikes, and piercing a lower surface of tubing.

Preferably, the spikes and roller are hollow and are connected to a vacuum source.

The preferred method of perforating further comprises sensing inflation of the incoming tubing and pushing the tubing down on the spiked roller and piercing the upper surface of the tubing with the spikes upon sensing excessive inflation.

Preferably, the pushing comprises pushing a roller downward against the upper surface of the tubing.

The preferred exhausting draws the tubing through a constricting device, which is a pair of rollers.

In the preferred cleaning fluid is sprayed from a jet onto an upper surface of the tubing.

Hot water and detergent or steam under high pressure may be used on the upper surface of the tubing.

The upper surface of the tubing is buffed with a rotating brush.

Preferably one rotates the brush at a speed greater than tangential speed of the tubing moving beneath the brush.

The preferred cleaning further comprises spraying rinsing fluid on the upper surface of the tubing.

The conveying of the tubing preferably comprises transporting the tubing on a movable open mesh belt conveyor.

It is useful to evacuate a chamber beneath the open mesh belt.

The preferred drying step comprises blowing drying gas on an upper surface of the tubing and removing the drying gas through the open mesh belt into the evacuated chamber below the open mesh belt and thereby concurrently flattening the tubing on the open mesh conveyor.

The aligning includes generally centering the flattened tubing as it moves from the open mesh conveyor belt.

Preferably, the aligning further comprises transferring the cleaned and dried tubing to a turnable conveyor having a surface of flexible belts.

The flexible belts are stretched as the turnable conveyor is turned.

In the preferred method the positioning comprises turning the flattened tubing toward and away from a printer before and after printing the tubing. Preferably, the turning comprises lifting the tubing from a horizontal conveyor with a sloped conveyor, turning the tubing downward with the sloped conveyor adjacent the printing head and conveying the tubing downward with the sloped conveyor.

The lifting, turning and moving the tubing downward with a sloped conveyor comprise carrying the belt on a generally triangularly shaped open mesh conveyor and evacuating a space beneath the open mesh conveyor while blowing fluid down against an upper surface of the tubing on the open mesh conveyor for flattening the tubing adjacent the printing head and for drying the tubing.

The preferred printing comprises "kiss" printing of an image upon the upper surface of the tubing by a movable screen.

Preferably, the printing comprises screening the image on the upper surface of the tubing by moving an endless screen at the same speed as the tubing and forcing printing material through the endless screen onto the upper surface of the tubing.

One preferred alternative printing comprises moving a screen into contact with the cleaned upper surface of the tubing, moving the screen along the tubing and forcing printing material through the screen while moving the screen.

Preferably, the flattening of the printed tubing on the downward slope of the conveyor further comprises flowing volatalizing and curing fluid against the upper surface of the printed tubing and through the open mesh conveyor belt.

Additionally, a roller is turned above the tubing beyond the downward turning of the tubing for feeding a leading end of the tubing downward.

Heating the upper surface of the tubing is used for devolatilizing and curing after the printing.

The cutting includes sensing the printing on the upper surface of the tubing and sensing the knifeblade edges, and the driving comprises accelerating and decelerating the tubing according to the sensing.

One preferably accelerates the tubing between cutting steps and decelerates the tubing when cutting the tubing.

The preferred removing of the cut off elastic bands comprises conveying the elastic bands with reduced pressure.

One preferably separates the elastic bands from the removal with a cyclone separator or a screen type divertor or cage or other methods.

A preferred method of printing elastic bands comprises collapsing an elastic tubing, keeping the tubing collapsed throughout, cleaning the upper surface of the tubing from ink-adhesion inhibitors, accurately aligning the tubing for properly centered printing, firmly positioning the tubing for receiving images, creating impression transfer locations on the tubing for distortion-free imaging, printing images on the tubing, devolatilizing and curing the printed images, precisely cutting the tubing between the images at high speed and discharging the finished product comprising elastic bands with precisely positioned printed images.

Preferred apparatus for manufacturing printed elastic bands comprises collapsing means for collapsing an elastic tubing, flattening means for maintaining the tubing flattened throughout the apparatus, cleaning means for cleaning an upper surface of the tubing for removing ink-adhesion inhibitors, aligning means for aligning the tubing for properly centered printing, positioning means for positioning the tubing for receiving printed images, printing means for printing images on the tubing, devolatilizing and curing means for devolatilizing and curing ink images printed on the tubing, high speed cutting means for cutting ends of the tubing between printed images and discharging means for discharging the finished product. Any means capable of performing the functions may be used.

The preferred collapsing means comprises a roller studded with needle spikes which pierce the bottom of the tubing and a pair of rollers above and below the tubing following the studded roller for constricting the tubing to collapsed form by forcing internal fluid from the tubing through the pierced wall of the tubing.

The preferred collapsing means further comprises sensing means for sensing proximity of an upper wall of the tubing to the sensing means and descending roller means positioned above the tubing and means for descending the roller means on the tubing when the proximity sensor senses proximity of the upper surface of the tubing for driving the upper surface of the tubing downward on the needle spikes on the studded roller to pierce the upper surface of the tubing as well as the lower surface of the tubing.

First open mesh conveyor means is positioned beneath the lower surface of the tubing and extending from a proximal position near the collapsing means and cleaning means to a distal position removed from the cleaning means. First evacuating means is positioned beneath the open mesh conveyor for holding the tubing down on the open mesh conveyor and for drawing fluids around the tubing, and further comprises blower means mounted above the tubing keeps the tubing collapsed by blowing fluid downward on an upper surface of the tubing adjacent the first open mesh conveyor.

The cleaning means includes a first cleaning jet extending across an upper surface of the tubing for delivering cleaning fluid under pressure to an upper surface of the tubing, scrubbing means above the upper surface of the tubing for contacting the upper surface of the tubing and for scrubbing the upper surface of the tubing following the spraying of cleaning fluid on the tubing and a rinsing jet extending across the tubing after the scrubbing means for rinsing fluid from the tubing and through the open mesh first conveyor.

The first open mesh conveyor is sufficiently long to provide drying of the tubing.

The preferred aligning means comprises a pivotable aligning conveyor positioned at the distal end of the first open mesh conveyor.

In a preferred embodiment, the pivotal aligning conveyor comprises a first grooved roll having an axis positioned near the distal end of the first open mesh conveyor and a second grooved roll having a movable axis mounted on a pivot which is spaced from the first and second axis and which is transverse to the first and second axis. Plural elastomeric belts are mounted in the grooves of the first and second rollers. Edge sensing means are positioned near the distal end of the aligning conveyor for sensing edges of the tubing. Moving means are connected to the aligning conveyor for turning the second axis around the pivot in response to the edge sensing means.

The preferred positioning means is a triangularly shaped open mesh conveyor positioned adjacent the aligning means for receiving the tubing from the aligning means and for lifting the tubing into contact with the printing means and for turning the tubing downward and moving the tubing quickly away from the printing means. The triangular conveyor has an evacuation chamber beneath the conveyor for drawing fluid through the conveyor. Blower means positioned above the conveyor force fluid downward on the tubing for holding the tubing flat on the triangular conveyor.

A preferred printing means comprises a screen and means for moving the screen in contact with the tubing and means for flowing ink through the screen onto areas of the tubing.

Preferably, the screen is a continuous screen mounted on rollers above the tubing, and the screen moves concurrently with the tubing.

In one form the screen is mounted on a frame and means lift the frame and lower the frame into contact with the tubing and move the screen along the tubing.

The preferred devolatilizing and curing means comprise a final open mesh conveyor, a final evacuating chamber beneath the final open mesh conveyor and means above the final conveyor for directing the fluid current downward on the conveyor to flatten the tubing on the conveyor and to devolatilize and cure the ink.

The preferred cutting means comprises blades mounted on a roller having an axis perpendicular to the direction of movement of the tubing and further comprising nip rollers positioned above and below the tubing for pinching and driving the tubing. A final roll is positioned above a cutoff platen at the end of the tubing. The final roll is driven faster than the nip roll. Printing sensing means positioned above the printed tubing between the top nip rolls and final roll sense printing on the tubing. Blade sensing means mounted adjacent the blades sense position of the blades. Driving means connected to the nip rolls accelerate and decelerate the tubing according to the printing sensor and to the blade sensor.

The preferred discharging means comprises an evacuated chamber beneath the roller which mounts the blades and a cyclone separator connected to the evacuated chamber for drawing cut off elastic bands from the evacuated chamber and for separating air from the rubber bands remote from the evacuated chamber.

This invention provides apparatus cutting off printed elastic bands from a printed elastic tubing comprise nip rollers engaging upper and lower surfaces of the printed tubing, synchronous drive means connected to the nip rollers for driving the nip rollers, a platen positioned beneath a distal end of the tubing and a large roller having knives oriented transversely to the tubing for moving the knives near a distal edge of the platen and cutting off elastic bands. A final roller is positioned above the platen near the distal end. Drive means connected to the final roller and to the nip rollers drive a surface of the final roller faster than a surface of the nip rollers. The final roller slips on the upper surface for drawing forward, for ensuring flatness of the tubing at the cutting. Print sensing means positioned above the tubing between the nip rollers and the final roller senses printing on the tubing and blade sensing means positioned adjacent the blades senses position of the blades. Coordinating means connected to the printing sensing means and to the blade sensing means and to the drive accelerates and decelerates the tubing according to the sensings.

The invention provides a printing apparatus for printing elastic tubing prior to cutting the tubing into printed elastic bands comprising a printer, a conveyor having three rolls mounted on triangularly arranged axes, one axis being near the printer for moving the tubing toward a printer and for directing tubing away from the printer after it has been printed.

Preferably, an open mesh belt extends around the rollers. An evacuated chamber is positioned beneath the open mesh belt. A pressure source above the open mesh belt flows fluid downward on the tubing and flattens the tubing on the belt before and after printing.

These and further and other objects and features of the invention are apparent in the above and ongoing specification, which includes the claims and the drawings.

DETAILED DESCRIPTION OF THE DRAWINGS

Figures 1, 2, 7, 8:
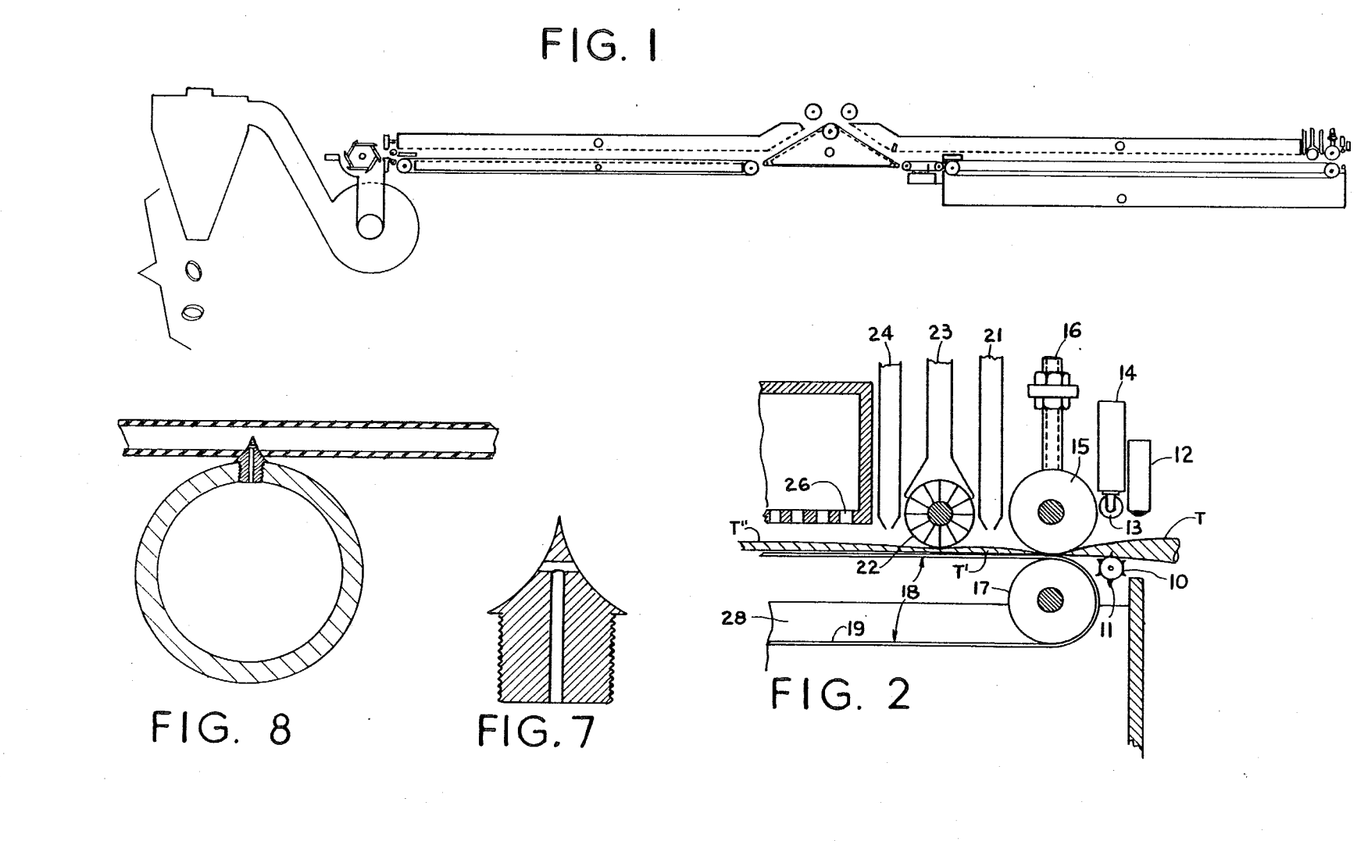
FIG. 1 is a schematic representation of producing printed elastic bands from elastic tubing.
FIG. 2 is a detail of perforating, washing and conveying the tubing.
FIG. 7 is a detail of perforating spikes.
FIG. 8 is a detail of perforating roller and spikes.

FIG. 1 gives an overall view of this unique system which collapses the elastic tubing, keeps it collapsed throughout the system, cleans the upper surface from ink-adhesion inhibitors, accurately aligns the tubing for properly centered printing, firmly positions the tubing for receiving the image, creates impression transfer location for distortion-free imaging, provides image ink devolatilizing and curing, precisely cuts between-the-images at high-speed, and efficiently discharges the finished product. This unique system is self-threading and is automatically aligning for minimal attendance by operating personnel.

This is a unique method of manufacturing printed rubber bands from thin-walled elastic tubing which has been formed and vulcanized in circular form by methods such as those described in U.S. Pat. Nos. 2,781,550 and 3,787,552.

In FIG. 2, the elastic tubing T is drawn over roller 10 that is studded with needle spikes 11, which pierce the bottom of the tubing T. This allows the release and evacuation of fluid (commonly air) trapped inside the tubing T. Roller 10 and spikes 11 may be hollow and may be evacuated, as later described. When the quantity of trapped fluid becomes excessive, the tubing T expands until the sensor 12, a photoelectric, sonic, or capacitive proximity sensor, triggers the roller 13 to descend upon the tubing T driving the spikes 11 through both the underside and the upperside of the tubing T. This provides dual (upperside and underside) paths to release the internal fluid pressure from the tubing T, and thereby continuously provides uniform collapsing of the tubing T. Linear actuator 14, an electric solenoid or a pneumatic or hydraulic cylinder, retracts roller 13 when tube T is sufficiently deflated, as sensed by sensor 12. The lanced tubing is referred to as T'. The tubing T∝ is drawn through a constricting device consisting of a pair of rolls 15 and 17 selectively relatively positioned, as by the adjustment screw 16, so that the tubing T' is initially constricted to collapsed form with no internal fluid as it is drawn into the system. The tubing T' is transported on conveyor 18, the endless open-mesh conveyor belt 19 on the pair of rolls 17 and 20 which are driven by a servo motor.

The length of conveyor 18 is predicated by the desired manufacturing rate, which may be commensurate with the speed of the tubing manufacturing method, the chemical composition of the elastic tubing, and the drying rate of the gas directed through jets 26 toward the tubing.

Tubing T' in collapsed form passes under fluid jet 21, which sprays a cleaning fluid, preferably hot water and detergent or steam, under high pressure upon the upper surface of Tubing T' to begin the cleaning process. The tubing T' then passes under rotating brush 22 which buffs the upper surface of the tubing T', removing all contaminants, such as stearic acid, wax, sulphur, salt crystals, and oxides, which could inhibit ink adhesion later. The rotating brush 22 spins in the same direction as roller 15 but at a higher rate, to provide sufficient buffing action. The brush 22 continuously is purged of contaminants by suction hood 23, which is attached to a high-pressure exhaust blower intake, thereby drawing air over the brush to vacuum away the contaminants. The tubing T' then passes under fluid jet 24 which sprays a rinsing fluid (commonly clean water) upon the buffed surface of the tubing T' to complete the cleaning. The rinsing fluid flows off the tubing T', through the open mesh conveyor belt 19, and into catch basin 28 positioned under the whole length of open-mesh belt 19. The rinse waste then is discharged through drain port 29. The cleaned tubing is referred to as tubing T". The clean tubing T" passes under the drying gas hood 25, which directs the drying gas, preferably hot air, through openings 26, which are slotted or perforated holes, against the upper surface of tubing T". The drying gas removes any remaining fluid from the cleaned tubing T" surface as it is conveyed and maintains the tubing T" in collapsed form. The drying gas enters the drying gas hood 25 through inlet 27 under pressure from the generation source.

Figures 3, 6:
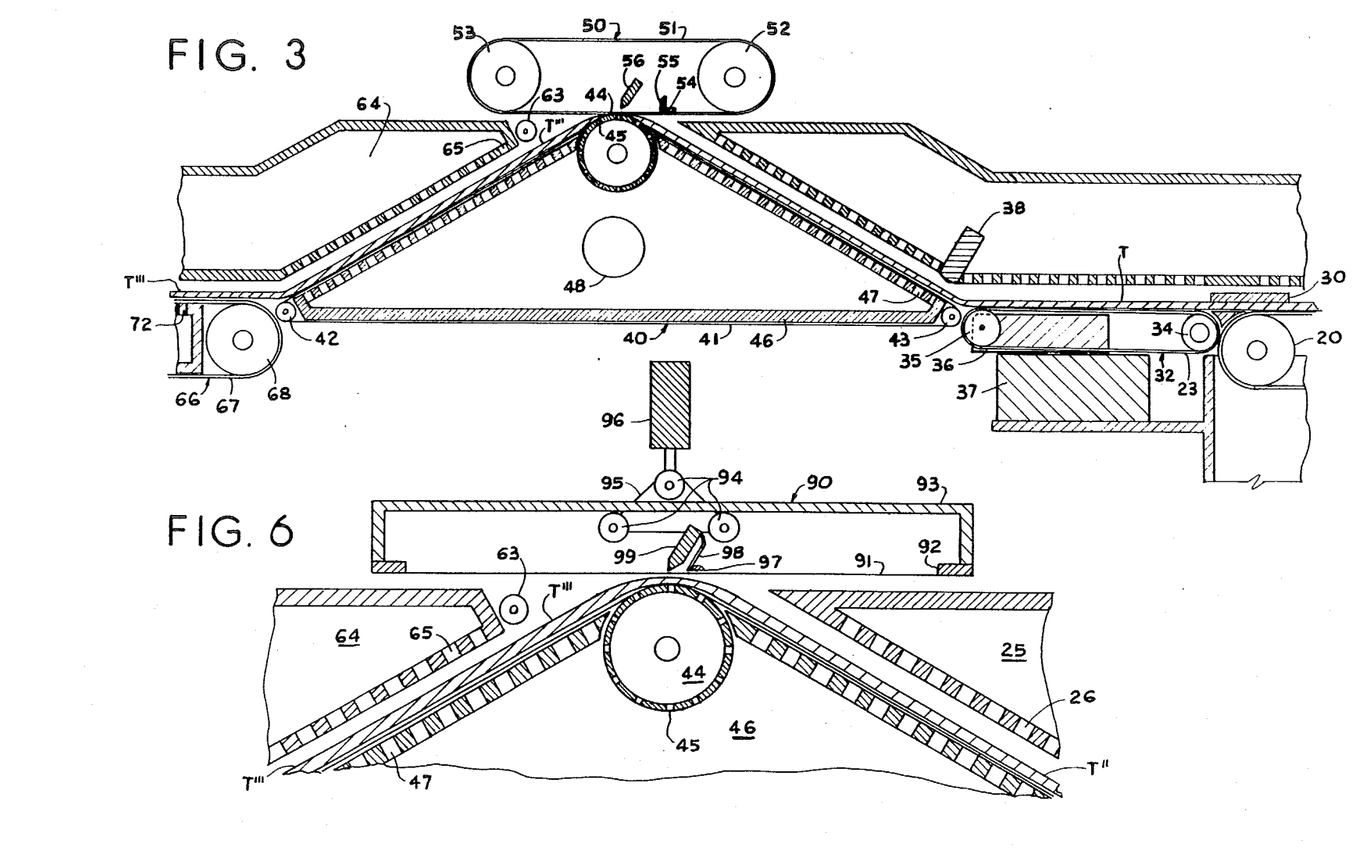
FIG. 3 is a detail of aligning, flattening, raising, lowering, printing, redirecting, devolatilizing and curing.
FIG. 6 is a detail of alternate printing.

In FIG. 3, the tubing T" being conveyed on open-mesh belt 19 is aligned by "V"-guides 30 toward the center of the conveyor 18. The "V"-guides 30 are mounted on support 31, which also transitionally supports the tubing T" as it leaves the open-mesh belt 19 and as the tubing T" is deposited at the center of automatic alignment conveyor 32. Support 31 may be hollow and may be provided with holes in its upper surface through which low pressure air is exhausted to support the tubing T" and to reduce friction. Variations in the width of the elastic tubing T" limits the effective centering alignment ability of the stationary "V"-guides 30. The automatic alignment conveyor 32 is therefore essential for precision final alignment of the elastic tubing T" approaching conveyor 40 where the ink image will be applied. The automatic alignment conveyor 32 is the group of elastic endless conveyor belts 33 supported by rolls 34 and 35. Rolls 34 and 35 have recessed surface grooves sufficiently deep to keep the endless belts 33 separated and running parallel to each other. Roll 34 is driven by a servo motor so that the surface of belt 33 moves simultaneously with the surface of belt 19. The alignment sensor 38, which is a photoelectric, pneumatic reflective, sonic, or capacitive proximity sensor, controls the side-to-side motion 39 of the yoke 36 and roll 35 by servo mechanism 37. As the tubing T" passes under sensor 38, the tubing T" is precisely automatically aligned on the conveyor 40. The elastic tubing T" has the tendency to move sideways during conveyance and must be precisely aligned on conveyor 40 for accurate printing. Sideways movement of the tubing may be due to the nature of the rubberlike tube product and its extruding and curing.

Conveyor 40 is an open-mesh endless belt 41 supported by rollers 42, 43, and 44 in a triangular arrangement to give conveyor 40 a pitched center atop roller 44. Rollers 44, 43, and 42 are driven by a servo motor so that the surface of belt 41 moves simultaneously with the surfaces of belts 33 and 19. Roll 44 has openings 45 (slots or perforations) and the triangular vacuum hood 46 has openings 47 (slots or perforations), which draw the underside of tubing T" stationary against open mesh belt 41 during conveyance. The vacuum hood is evacuated through port 48 which is connected to the intake of a vacuum generator, a blower or vacuum pump intake. The drying gas emitted from the drying gas hood 25 keeps the upper surface of the tubing T" pressed down thereby maintaining the collapsed form of tubing T" as well as keeping the tubing stationarily aligned on belt 41 in preparation for printing.

A printing head 50 applies the ink image to the upper surface of the collapsed tubing T" as it is conveyed by belt 41 over the top of roller 44. The ingress and egress of the tubing T" must be at sufficient angles created by conveyor 40 so as to minimize the tangential contact between the printing head 50 and the tubing T" surface. Excessive contact by conventional means, such as flat conveyors or rollers which are not self-threading, cause image registration difficulties (double images, blurred lines, smearing, and ink thickness inconsistencies). The upper surface of elastic tubing T" must be stressed evenly and must be positioned firmly while maintaining its collapsed form as the image ink is applied. The angles of ingress and egress give instant image transfer (kiss printing) at the (nip) tangent point of printing head 50 with the upper surface of elastic tubing T". FIG. 3 illustrates a continuous screen printing head 50 as one of many types of satisfactory printing heads which may be used with this manufacturing method. The continuous screen printer 50 is an endless belt printing screen 51, which has been image masked and which is supported by rolls 52 and 53. The rolls 52 and 53 are driven by a servo motor so that the surface of belt 51 moves simultaneously with the surface of belt 41 for accurate printing registration. The ink 54, an elastomeric polymer or dye stain, is distributed on the masked screen belt 51 by spreader blade 55. The ink flows through the image mask in the screen belt 51 as the elastomeric squeegee 56 presses the belt 51 against the upper surface of tubing T". Thus, ink is deposited accurately on the tubing T" surface.

FIG. 6 illustrates an alternative reciprocating-screen intermittent-motion flat-bed screen printer head 90. The image masked screen 91 is supported by frame 92 and is mounted on a reciprocating yoke 93. The yoke is driven forward and backward by a triangular cluster of rolls 94 mounted in bracket 95. The linear actuator, an electric solenoid or a pneumatic or hydraulic cylinder, 96 lowers the bracket 95 until the screen 91 touches the upper surface of tubing T" at the beginning of a printing cycle. A servo motor drives the rolls 94 supporting yoke 93 forward simultaneously with the movement of the tubing T". The ink 97 is distributed over the image masked screen 91 by spreader blade 98. The ink 97 flows through as the squeegee 99 presses the screen 91 to the tubing T". Once the forward printing stroke is complete, the linear actuator 96 lifts the screen 91 from the tubing T", the servo motor driving rolls 94 retract the yoke 93 to the maximum opposite direction, and then the linear actuator 96 lowers the screen 91 back to the tubing T" upper surface. During the retraction stroke, the tubing T" may be stopped by the conveyor servo motors, awaiting the next forward printing stroke.

Alternately, the printing head 50 may be a standard rotary screen drum, flexographic drum, offset flexographic drum, letterpress drum, or gravure drum. Because the thickness of the elastic tubing T" varies, these alternatives must be either counter-balanced or automatically pressure (nip gap) adjusted by an integral sensor (photoelectric, sonic, capacitive proximity, load cell, or torque sensor) to provide continuous precision contact pressure with upper surface of the elastic tubing T". Alternately, the printing head 50 may be an ink-jet dot-matrix printer, or laser (light beam) marking imager, in which case, the conveyor 40 servo motor would move the tubing T" continuously or in intermittent-motion as described in the previous paragraph. After printing the tubing is referred to as printed tubing T'''.

Roll 63, driven clockwise by conventional motor, acts as a fail-safe jam avoider, by deflecting any initial ends of printed tubing T''' under the gas curing hood 64. This only occurs the moment the end of a section of tubing T''' initially egresses from the printing head's nip point. Once the tubing T''' is under the hood 64, there is no contact between roll 63 and the tubing T'''.

Curing gas, preferably hot air, enters the curing gas hood 64 under pressure from the generation source through inlet port 62 and is directed through openings 65 (slots or perforations) against the freshly printed surface of tubing T'''. The curing gas removes volatiles from the ink base and begins the ink curing process. Also mounted in the curing gas hood 64 structure and directed toward the printing tubing T''' may be curing acceleration devices such as infrared or ultraviolet light, electron beam, or microwave energy sources. Such devices are predicated upon the curing chemistry of the ink used for the printed images.

The tubing T''' is then transported on conveyor 66. The endless open-mesh conveyor belt 67 is supported by the pair of rolls 68 and 69 which are driven by a servo motor. Thus, the movement of open mesh belt 67 is simultaneous with the movement of belts 41, 33, and 19. Within the cavity inside conveyor 66 is a vacuum hood 70 which is connected to a vacuum source via port 71. The tubing T''' is held against the open-mesh belt 67 via the vacuum pull through the openings 72 (slots or perforations) in the vacuum hood 70. This coupled with the downward force by curing gas emitting from the curing gas hood 64 prevents the tubing T''' from slipping sideways during the drying or curing of the ink.

Figure 4:
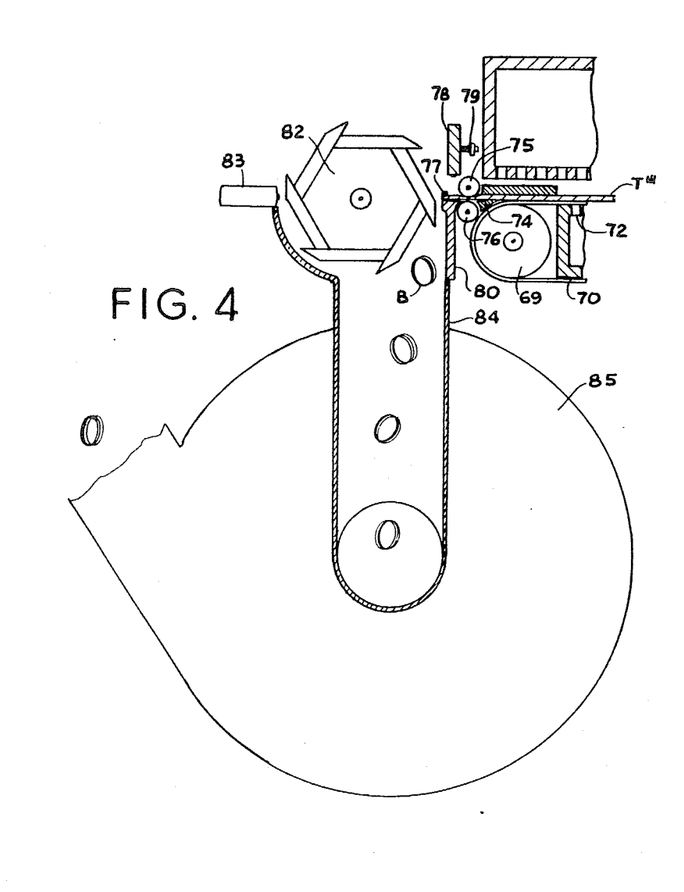
FIG. 4 is a detail of cutting and removing bands.
Figure 5:
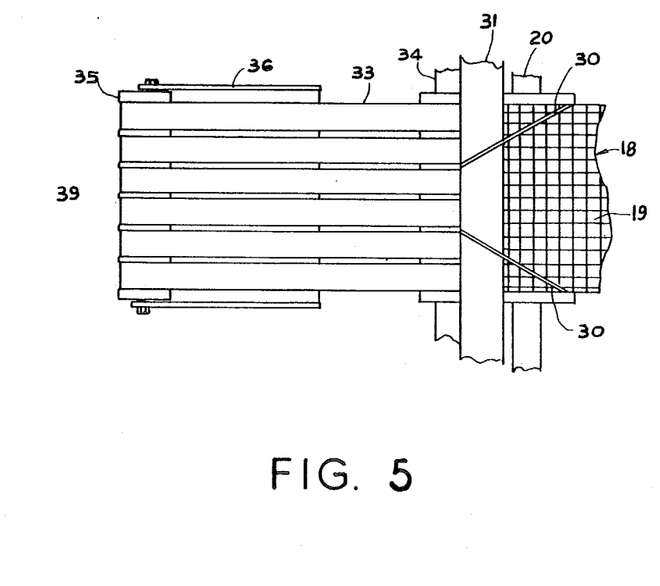
FIG. 5 is a detail of the aligning.

In FIG. 4, the tubing T''', which has a cured ink image printed on the upper surface, is aligned by "V"-guides 73 toward the center of the conveyor 66. The "V"-guides are mounted on support 74 which also transitionally supports the tubing T''' as it leaves the open-mesh conveyor 66 and enters the constricting device (nip-rolls) formed by rolls 75 and 76. These nip-rolls provide positive, accurate control of the tubing T''' as it enters the cutting stage, and are driven by a servo motor. The final roll 77 is driven by a servo motor with the nip-rolls but spins at least twice the surface speed of the nip-rolls so as final roll 77 slips on the upper surface of tubing T''', roll 77 urges the upper surface forward and keeps the upper surface down so that tubing T''' is as collapsed as possible between the nip-rolls and the final roll 77.

The sensor 78, which is a retroreflective photoelectric or laser scanner, in combination with the sensor 83, controls the nip-rolls' 75, 76 servo motor controller to position tubing T''' for accurate cutting between the images printed on tubing T'''. The fly knives 81 mounted on hub 82 and driven by a servo (commonly a synchronous type for consistent accurate speed) motor (not shown) shear against the bed knife 80 in a scissor-type cutting action slicing the rubber bands B individually from tubing T'''. The rotary cutting head may have removable fly knives 81 or have the cutting edges milled integral to hub 82 as a solid rotary cutting head. There may be 1 to 32 (or more) fly knives 81 or similarly milled cutting edges on hub 82. Sensor 78 is position adjustable by screw 79 to provide accurate sensing location between rolls 75 and 77 for triggering the nip-rolls' 75, 76 forward motions. Sensor 83, a photoelectric or inductive proximity sensor, senses that a cutting edge of fly knives 81 has just completed slicing a rubber band B from tubing T''' and signals the nip rolls' 75, 76 servo motor differential controller to accelerate the moving tubing T''' toward the appropriate position for the next slice to be completed. Sensor 78 detects the presence of the next image on tubing T''' and signals the nip rolls' 75, 76 servo motor differential controller to decelerate appropriately so that the next cut will be accurately spaced between the printed images on tubing T'''. The rotary cutting head 82 servo motor's speed is adjustable to give the desired overall production rate, which may be commensurate with the speed of the elastic tubing manufacturing method speed. The nip-rollers 75, 76 servo motor is, in essence, slave to the speed of the cutting head as it must accurately position additional tubing T''' in preparation for the next cut within the time interval between slices of the cutting head knives 81. The servo motors of conveyors 66, 40, 32, 18 and printing head 50 move simultaneously with the servo motor of nip rolls 75, 76. Control circuitry may be incorporated to permit the servo motors of conveyors 66, 40, 33, 18 and printing head 50 to move at a averaged constant rate commensurate with the linear motion created by nip-rolls 75, 76. If the printing head is an intermittent-motion type, such as 90 illustrated in FIG. 6, the nip rolls' 75, 76 servo motor differential controller is overridden during the non-printing time between printing strokes so the tubing T''' is not moved between prints.

Rotary cutting has the problem that, at high speeds, rubber bands B have the tendency to cling due to the vacuum around the spinning head to the head under the knives 81, be carried back over the top of the head back into the cutting area and become chopped to particles. The problem is eliminated by the pneumatic blower 85 with a material-handling fan wheel which instantly vacuums the rubber bands B away from the fly knives 81 the instant they are cut from T''' and are drawn down conduit 84 into the blower 85. The blower 85 discharges the rubber bands B' through conduit 86 into cyclone separator 87. The air exhausts through top port 89 while the rubber bands B'' are discharged at the cyclone 87 bottom port 88. Thus, the discharge may be mounted elsewhere in the factory, such as over storage containers or packaging equipment for efficient material handling.

Alternatively, the elastic bands may be removed from the vacuum removal equipment by screen diverters or screen cages or any other means.

Referring to FIGS. 7 and 8, a preferred tubing exhausting or deflating device comprises a hollow roller 10' with hollow spikes 11' with passageways 11''.

A reduced pressure in hollow roller 10 exhausts fluid from the inside of tubing T to collapse and flatten the tubing. When the upper push-down roller 13 is used points 11''' of spikes 11' puncture the upper surface of the tubing.

When small diameter tubing is employed it is useful to place double-stick tape in the leading edge of the tubing to keep the leading edge closed and flat and to keep the tube sealed as the leading edge passes through the equipment.

While the invention has been described with reference to specific embodiments, modifications and variations of the invention may be constructed without departing from the scope of the invention. The scope of the invention is defined in the following claims.

What I claim is:

1. The method of making printed elastic bands comprising feeding an elastic tubing into a perforating apparatus, perforating the tubing, exhausting fluid from within the tubing, flattening the tubing, cleaning the tubing, drying the tubing, continuously conveying the tubing, keeping the tubing flat, aligning the tubing, printing the tubing, aligning the printed tubing, driving the tubing, drying and curing the printed image, and cutting off lengths of the printed tubing into printed elastic bands and removing the printed elastic bands.

2. The method of claim 1 wherein the perforating comprises feeding the tubing over a roller with generally radially directed spikes, and piercing a lower surface of tubing.

3. The method of claim 2 further comprising sensing inflation of the incoming tubing and pushing the tubing down on the spiked roller and piercing the upper surface of the tubing with the spikes upon sensing excessive inflation.

4. The method of claim 3 wherein the pushing comprises pushing a roller downward against the upper surface of the tubing.

5. The method of claim 1 wherein the exhausting fluid comprises drawing the tubing through a constricting device comprising a pair of rollers.

6. The method of claim 1 wherein the cleaning comprises spraying fluid from a jet onto an upper surface of the tubing.

7. The method of claim 6 wherein the spraying comprises spraying hot water and detergent or steam under high pressure upon the upper surface of the tubing.

8. The method of claim 6 wherein the cleaning further comprises buffing the upper surface of the tubing with a rotating brush.

9. The method of claim 8 further comprising rotating the brush at a speed greater than tangential speed of the tubing moving beneath the brush.

10. The method of claim 6 wherein the cleaning further comprises spraying rinsing fluid upon the upper surface of the tubing.

11. The method of claim 1 wherein the conveying of the tubing comprises transporting the tubing on a movable open mesh belt conveyor.

12. The method of claim 11 further comprising evacuating a chamber beneath the open mesh belt.

13. The method of claim 1 wherein the drying step comprises blowing drying gas on an upper surface of the tubing and removing the drying gas through the open mesh belt into the evacuated chamber below the open mesh belt and thereby flattening the tubing on the open mesh conveyor.

14. The method of claim 13 wherein the aligning further comprises generally centering the flattened tubing as it moves from the open mesh conveyor belt.

15. The method of claim 1 wherein the aligning further comprises transferring the cleaned and dried tubing to a turnable conveyor having a flexible belt surface.

16. The method of claim 15 further comprising stretching the flexible belts as the turnable conveyor is turned.

17. The method of claim 1 wherein the positioning further comprises turning the flattened tubing toward and away from a printer before and after printing the tubing.

18. The method of claim 17 wherein the turning comprises lifting the tubing from a horizontal conveyor with a sloped conveyor, turning the tubing downward with the sloped conveyor adjacent the printing head and conveying the tubing downward with the sloped conveyor.

19. The method of claim 18 wherein the lifting, turning and moving the tubing downward with a sloped conveyor comprise carrying the belt on a generally triangularly shaped open mesh conveyor and evacuating a space beneath the open mesh conveyor while blowing fluid down against an upper surface of the tubing on the open mesh conveyor for flattening the tubing adjacent the printing head and for drying the tubing.

20. The method of claim 17 wherein the printing comprises "kiss" printing of an image upon the upper surface of the tubing by a movable screen.

21. The method of claim 20 wherein the printing comprises screening the image of the upper surface of the tubing by moving an endless screen at the same speed as the tubing and forcing printing material through the endless screen onto the upper surface of the tubing.

22. The method of claim 20 wherein the printing comprises moving a screen into contact with the cleaned upper surface of the tubing, moving the screen along the tubing and forcing printing material through the screen while moving the screen.

23. The method of claim 18 wherein the flattening of the printed tubing on the downward slope of the conveyor further comprises flowing volatalizing and curing fluid against the upper surface of the printed tubing and through the open mesh conveyor belt.

24. The method of claim 18 further comprising turning a roller above the tubing beyond the downward turning of the tubing and feeding a leading end of the tubing downward.

25. The method of claim 1 further comprising heating the upper surface of the tubing for devolatilizing and curing after the printing.

26. The method of claim 1 further comprising sensing the printing on the upper surface of the tubing and sensing the knifeblade edges and wherein the driving comprises accelerating and decelerating the tubing according to the sensing.

27. The method of claim 26 further comprising accelerating the tubing between cutting steps and decelerating the tubing when cutting the tubing.

28. The method of claim 1 wherein the removing of the cut off elastic bands comprises conveying the elastic bands with reduced pressure.

29. The method of claim 1 further comprising separating the elastic bands from the removal with a cyclone separator.

30. Apparatus for manufacturing printed elastic bands comprising collapsing means for collapsing an elastic tubing, flattening means for maintaining the tubing flattened throughout the apparatus, cleaning means for cleaning an upper surface of the tubing for removing ink-adhesion inhibitors, aligning means for aligning the tubing for properly centered printing, positioning means for positioning the tubing for receiving printed images, printing means for printing images on the tubing, devolatilizing and curing means for devolatilizing and curing ink images printed on the tubing, high speed cutting means for cutting ends of the tubing between printed images and discharging means for discharging the finished product, wherein the collapsing means comprises a roller studded with needle spikes which pierce the bottom of the tubing and a pair of rollers above and below the tubing following the studded roller for constricting the tubing to collapsed form by forcing internal fluid from the tubing through the pierced wall of the tubing.

31. The apparatus of claim 30 wherein the collapsing means further comprises sensing means for sensing proximity of an upper wall of the tubing to the sensing means and descending roller means positioned above the tubing and means for descending the roller means on the tubing when the proximity sensor senses proximity of the upper surface of the tubing for driving the upper surface of the tubing downward on the needle spikes on the studded roller to pierce the upper surface of the tubing as well as the lower surface of the tubing.

32. The apparatus of claim 30 wherein the printing means comprises a screen and means for moving the screen in contact with the tubing and means for flowing ink through the screen onto areas of the tubing.

33. The apparatus of claim 32 wherein the screen is a continuous screen mounted on rollers above the tubing and further comprising means for moving the screen concurrently with the tubing.

34. The apparatus of claim 32 wherein the screen is mounted on a frame and further comprising means for lifting the frame and lowering the frame into contact with tubing and moving the screen along the tubing.

35. Apparatus for manufacturing printed elastic bands comprising collapsing means for collapsing an elastic tubing, flattening means for maintaining the tubing flattened throughout the apparatus, cleaning means for cleaning an upper surface of the tubing for removing ink-adhesion inhibitors, aligning means for aligning the tubing for properly centered printing, positioning means for positioning the tubing for receiving printed images, printing means for printing images on the tubing, devolatilizing and curing means for devolatilizing and curing ink images printed on the tubing, high speed cutting means for cutting ends of the tubing between printed images and discharging means for discharging the finished product, further comprising first open mesh conveyor means positioned beneath the lower surface of the tubing and extending from a proximal position near the collapsing means and cleaning means to a distal position removed from the cleaning means, and first evacuating means positioned beneath the open mesh conveyor for holding the tubing down on the open mesh conveyor and for drawing fluids around the tubing, and wherein the means for keeping the tubing collapsed further comprises blower means mounted above the tubing for blowing fluid downward on an upper surface of the tubing adjacent the first open mesh conveyor.

36. The apparatus of claim 35 wherein the aligning means comprises a pivotable aligning conveyor positioned at the distal end of the first open mesh conveyor.

37. The apparatus of claim 36 wherein the pivotal aligning conveyor comprises a first grooved roll having an axis positioned near the distal end of the first open mesh conveyor and a second grooved roll having a movable axis mounted on a pivot which is spaced from the first and second axes and which is transverse to the first and second axes and plural elastomeric belts mounted in the grooves of the first and second rollers, edge sensing means positioned adjacent the distal end of the aligning conveyor for sensing edges of the tubing and moving means connected to the aligning conveyor for turning the second axis around the pivot in response to the edge sensing means.

38. Apparatus for manufacturing printed elastic bands comprising an open mesh first conveyor collapsing means for collapsing an elastic tubing, flattening means for maintaining the tubing flattened throughout the apparatus, cleaning means for cleaning an upper surface of the tubing for removing ink-adhesion inhibitors, aligning means for aligning the tubing for properly centered printing, positioning means for positioning the tubing for receiving printed images, printing means for printing images on the tubing, devolatilizing and curing means for devolatilizing and curing ink images printed on the tubing, high speed cutting means for cutting ends of the tubing between printed images and discharging means for discharging the finished product, wherein the cleaning means comprises a first cleaning jet extending across an upper surface of the tubing for delivering cleaning fluid under pressure to an upper surface of the tubing, scrubbing means above the upper surface of the tubing for contacting the upper surface of the tubing and scrubbing the upper surface of the tubing following the spraying of cleaning fluid on the tubing and a rinsing jet extending across the tubing after the scrubbing means for rinsing fluid from the tubing and through the open mesh first conveyor.

39. The apparatus of claim 38 wherein the first open mesh conveyor is sufficiently long to provide drying of the tubing.

40. Apparatus for manufacturing printed elastic bands comprising collapsing means for collapsing an elastic tubing, flattening means for maintaining the tubing flattened throughout the apparatus, cleaning means for cleaning an upper surface of the tubing for removing ink-adhesion inhibitors, aligning means for aligning the tubing for properly centered printing, positioning means for positioning the tubing for receiving printed images, printing means for printing images on the tubing, devolatilizing and curing means for devolatilizing and curing ink images printed on the tubing, high speed cutting means for cutting ends of the tubing between printed images and discharging means for discharging the finished product, wherein the positioning means comprises a triangularly shaped open mesh conveyor positioned adjacent the aligning means for receiving the tubing from the aligning means and for lifting the tubing into contact with the printing means and for turning the tubing downward and moving the tubing quickly away from the printing means, the triangular conveyor having an evacuation chamber beneath the conveyor for drawing fluid through the conveyor and further comprising blower means positioned above the conveyor for forcing fluid downward on the tubing for holding the tubing flat on the triangular conveyor.

41. Apparatus of claim 40 wherein the printing means for printing elastic tubing prior to cutting the tubing into printed elastic bands comprises a printer, a conveyor having three rolls mounted on triangularly arranged axes, one axis being near the printer for moving the tubing toward the printer and for directing tubing away from the printer after it has been printed.

42. The apparatus of claim 41 further comprising an open mesh belt extended around rollers and an evacuated chamber beneath the open mesh belt and a pressure source above the open mesh belt for flowing fluid downward on the tubing and flattening the tubing on the belt before and after printing.

43. Apparatus for manufacturing printed elastic bands comprising collapsing means for collapsing an elastic tubing, flattening means for maintaining the tubing flattened throughout the apparatus, cleaning means for cleaning an upper surface of the tubing for removing ink-adhesion inhibitors, aligning means for aligning the tubing for properly centered printing, positioning means for positioning the tubing for receiving printed images, printing means for printing images on the tubing, devolatilizing and curing means for devolatilizing and curing ink images printed on the tubing, high speed cutting means for cutting ends of the tubing between printed images and discharging means for discharging the finished product, wherein the devolatilizing and curing means comprises a final open mesh conveyor, a final evacuating chamber beneath the final open mesh conveyor and means above the final conveyor for directing a fluid current downward on the conveyor to flatten the tubing on the conveyor and to devolatilize and cure the ink.

44. Apparatus for manufacturing printed elastic bands comprising collapsing means for collapsing an elastic tubing, flattening means for maintaining the tubing flattened throughout the apparatus, cleaning means for cleaning an upper surface of the tubing for removing ink-adhesion inhibitors, aligning means for aligning the tubing for properly centered printing, positioning means for positioning the tubing for receiving printed images, printing means for printing images on the tubing, devolatilizing and curing means for devolatilizing and curing ink images printed on the tubing, high speed cutting means for cutting ends of the tubing between printed images and discharging means for discharging the finished product, wherein the cutting means comprises blades mounted on a roller having an axle perpendicular to the direction of movement of the tubing and further comprising nip rollers positioned above and below the tubing for pinching and driving the tubing and a final roll positioned above a cutoff platen at the end of the tubing and means for driving the final roll faster than the nip roll, printing sensing means positioned above the printed tubing between the nip rolls and final rolls for sensing printing on the tubing and blade sensing means mounted adjacent the blades for sensing position of the blades and driving means connected to the nip rolls for accelerating and decelerating the tubing according to the printing sensor and to the blade sensor.

45. The apparatus of claim 44 wherein the discharging means comprises an evacuated chamber beneath the roller which mounts the blades and a cyclone separator connected to the evacuated chamber for drawing cut off elastic bands from the evacuated chamber and for separating air from the rubber bands remote from the evacuated chamber.

46. Apparatus for cutting off printed elastic bands from a printed elastic tubing comprising nip rollers engaging upper and lower surfaces of the printed tubing, synchronous drive means connected to the nip rollers for driving the nip rollers, a platen positioned beneath a distal end of the tubing and a large roller having knives oriented transversely to the tubing for moving the knives near a distal edge of the platen and cutting off elastic bands, a final roller positioned above the platen near the distal end and drive means connected to the final roller and to the nip rollers for driving a surface of the final roller faster than a surface of the nip rollers for ensuring flatness of the tubing at the cutting, printing sensing means positioned above the tubing between the nip rollers and the final roller for sensing printing on the tubing and blade sensing means positioned adjacent the blades for sensing position of the blades and coordinating means connected to the printing sensing means and to the blade sensing means and to the drive for accelerating and decelerating the tubing according to the sensings.

47. The apparatus of claim 32 wherein the aligning means includes pivotal aligning conveyor apparatus comprising a first grooved rool mounted on a first axis positioned near a distal end of a first conveyor and a second grooved roll mounted on a second movable axis which is mounted on a pivot spaced from the first and second axes and which is transverse to the first and second axes and plural elastomeric belts mounted in the grooves of the first and second rollers, edge sensing means positioned adjacent the distal end of the aligning conveyor for sensing edges, and moving means connected to the aligning conveyor for turning the second axis around the pivot in response to the edge sensing means.

48. Tubing collapsing apparatus comprising a roller studded with needle spikes which pierce the bottom of the tubing and a pair of rollers above and below the tubing following the studded roller for constricting the tubing to collapsed form by forcing internal fluid from the tubing through the pierced wall of the tubing wherein the collapsing apparatus further comprises sensing means for sensing proximity of an upper wall of the tubing to the sensing means and descending roller means positioned above the tubing and means for descending the roller means on the tubing when the proximity sensor senses proximity of the upper surface of the tubing for driving the upper surface of the tubing downward on the needle spikes on the studded roller to pierce the upper surface of the tubing as well as the lower surface of the tubing.

49. The apparatus of claim 48 wherein the roller is hollow and the spikes are hollow for communicating an interior of the tubing with an interior of the roller and further comprising means to evacuate the roller.

* * * * *